(12) United States Patent
Regueiro Fernandez et al.

(10) Patent No.: US 11,181,275 B2
(45) Date of Patent: Nov. 23, 2021

(54) UNIVERSAL DEVICE FOR THE AUTOMATION OF SOLID FUEL BARBECUES AND OVENS

(71) Applicant: BONELESS GRILLS SL, Barcelona (ES)

(72) Inventors: Marcos Regueiro Fernandez, Barcelona (ES); Alfredo Beltran Ruiz, Barcelona (ES); Alfredo Beltran Rosa, Barcelona (ES); Ruben Campos Moral, Barcelona (ES)

(73) Assignee: BONELESS GRILLS SL, Barcelona (ES)

( * ) Notice: Subject to any disclaimer, the term of this patent is extended or adjusted under 35 U.S.C. 154(b) by 51 days.

(21) Appl. No.: 16/121,815

(22) Filed: Sep. 5, 2018

(65) Prior Publication Data

US 2019/0277505 A1 Sep. 12, 2019

Related U.S. Application Data

(63) Continuation-in-part of application No. 15/912,981, filed on Mar. 6, 2018, now abandoned.

(51) Int. Cl.
*F24B 1/189* (2006.01)
*A47J 37/07* (2006.01)
*A47J 37/06* (2006.01)

(52) U.S. Cl.
CPC ......... *F24B 1/1895* (2013.01); *A47J 37/0786* (2013.01); *A47J 37/0664* (2013.01)

(58) Field of Classification Search
CPC ........................... A47J 37/0786; F24B 1/1895
See application file for complete search history.

(56) References Cited

U.S. PATENT DOCUMENTS

| | | | | |
|---|---|---|---|---|
| 1,655,873 A | * | 1/1928 | Nelson | F24B 1/1895 126/539 |
| 3,115,820 A | * | 12/1963 | Adelt | F23L 17/02 454/39 |
| 3,817,162 A | * | 6/1974 | Guelph | F23L 17/02 454/42 |
| 4,430,985 A | * | 2/1984 | Huneycutt | A47J 37/0704 126/25 A |
| 5,404,801 A | * | 4/1995 | Holland | A47J 37/0786 126/25 R |
| 5,609,522 A | * | 3/1997 | Szwartz | F23L 13/02 110/162 |

(Continued)

*Primary Examiner* — Jorge A Pereiro
*Assistant Examiner* — Logan P Jones
(74) *Attorney, Agent, or Firm* — Blue Filament Law PLLC

(57) ABSTRACT

A universal device for the automation of solid fuel barbecues and ovens is provided that includes an automated draft butterfly-type valve housed in a chimney module. The chimney module can be installed at the smoke exhaust of the oven or barbecue over which control is intended. An electronic board is housed in a control module linked to a motor. The motor rotates the butterfly-type valve that in turn drives the exit of the gas flow via an exit signal that supplies the butterfly-type valve. The electronic board is in connection with at least a room temperature probe located within the chamber of the oven or barbecue. The control module has a control means and a power supply. A solid fuel barbeque can be fitted with the universal device.

11 Claims, 3 Drawing Sheets

(56) References Cited

U.S. PATENT DOCUMENTS

| | | | | |
|---|---|---|---|---|
| 8,113,823 | B2 * | 2/2012 | Guzorek | F23L 11/005 |
| | | | | 126/285 R |
| 8,636,567 | B2 * | 1/2014 | Fitzgerald | F24F 13/105 |
| | | | | 454/333 |
| 8,800,542 | B1 | 8/2014 | Kennington | |
| 9,427,107 | B2 | 8/2016 | Reinhart | |
| 2004/0209215 | A1 * | 10/2004 | Abel | F23J 13/00 |
| | | | | 431/346 |
| 2005/0247304 | A1 * | 11/2005 | Weiss | F23N 3/02 |
| | | | | 126/504 |
| 2010/0258106 | A1 * | 10/2010 | Simms, II | A47J 37/0704 |
| | | | | 126/25 R |
| 2011/0094496 | A1 * | 4/2011 | McCown | F23L 11/00 |
| | | | | 126/289 |
| 2013/0061765 | A1 * | 3/2013 | Reinhart | F24B 1/187 |
| | | | | 99/329 R |
| 2016/0037966 | A1 * | 2/2016 | Chin | A47J 37/0647 |
| | | | | 426/231 |

* cited by examiner

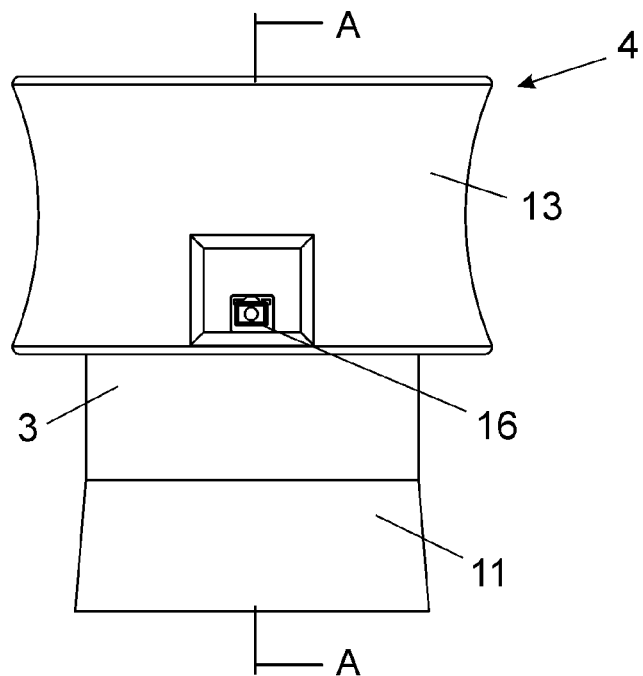
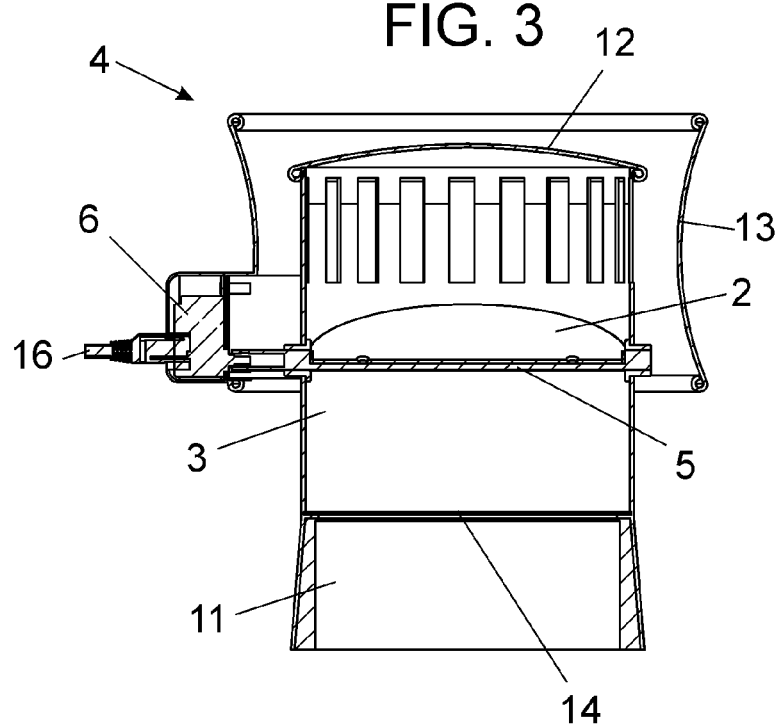

UNIVERSAL DEVICE FOR THE AUTOMATION OF SOLID FUEL BARBECUES AND OVENS

RELATED APPLICATIONS

This application is a continuation in part of U.S. application Ser. No. 15/912,981 filed 6 Mar. 2018; the contents of which are hereby incorporated by reference.

OBJECT OF THE INVENTION

The invention, as stated in the title of this specification refers to a universal device for the automation of solid fuel barbecues and ovens that contributes to the functions to which it is designed, advantages and characteristics that are described in detail thereafter and that mean a significant novelty in the current state of the art.

The object of this invention refers to a universal device for the automatic regulation and control of temperature of already existing ovens and barbecues, as well as their similar and derived ones, provided that their heating means is by combustion of solid fuels such as wood, charcoal, similar or derived ones, by means of the control of draft flow or chimney though a robotic butterfly-type valve, incorporated in a chimney module, that is incorporated to a smoke exhaust duct or chimney of the oven, the operation of which is controlled from a control module that, optionally, possesses remote control by means of app or web. A second object of the invention is the barbecue or oven that incorporates the automation device.

FIELD OF APPLICATION OF THE INVENTION

The field of application of this invention is within the sector of the industry engaged in the production of electronic devices, namely focussed in the scope of those that can be applied as control accessory for ovens, barbecues and the like.

BACKGROUND OF THE INVENTION

In the market, several options for the same purpose as that of the device object of this invention are known, that do not achieve an optimum result. The said inventions can be divided into two types: blowing devices, adaptable to the combustion air intake and devices adaptable to the smoke exhaust or chimney of the combustion chamber. However, in both types problems were detected that are overcame by means of the device of the invention.

In the event of the devices adaptable to the combustion air intake, as the disclosed in the U.S. Pat. No. 8,800,542B1, they are mainly composed by a fan that blows air to the combustion area to brisk up the embers and thus reach the wished temperature, turning off the fan when such temperature has been reached in order to keep the target temperature.

The problem of this type of device is that it only can operate when the temperature is lower than that wished, not being able to reduce the temperature once the wished temperature has been exceeded. Likewise, as it operates by blowing, it is the device itself that repeatedly provokes, by excess of air in the combustion, the uncontrolled increase of the temperature, even creating flames in the bed of embers, obliging the user to manually close the draft valve or chimney to try to reduce the said excess of temperature, therefore actually it is not a fully automatic device.

As for those adaptable to the smoke exhaust or chimney, there exists an temperature automatic control device adaptable to the smoke exhaust or chimney with patent number U.S. Pat. No. 9,427,107 B2, consisting in two perforated disks, one being stationary and the second rotating on the first so that it can close the exit flow by making that the holes of one of them is coincident with the non-perforated part of the other, as well as making that the holes of one of them are coincident with those of the other in its position of maximum outflow.

The problem of this device is that, in its position of maximum opening, it cannot achieve a surface of smoke passage or draft of half the surface of the chimney where it has been installed, making thus difficult the quick temperature rises or making impossible to obtain a high temperature for the functions that do require it. Also the problem has been detected that, as they are submitted to high temperature due to the normal operation of the device to be controlled, the disks sustain a deformation, losing the contact to each other and thus unwanted openings appearing that make their correct operation impossible because that means a variation in the surface of smoke passage or draft making even impossible to completely close the smoke passage or draft in the case it would be necessary to be able to restrain a sudden temperature rise due to flames appearing in a bed of embers. It was also detected that, as it is a system coupled to the smoke exhaust, it has no type of element protecting the smoke exhaust from rainfalls or external elements entering within the chamber, as well as no system protecting the smoke exhaust from the action of the wind, which speed can vary the speed of smoke exhaust creating a Venturi effect on it or creating a flow-back effect in the draft making the combustion impossible.

The objective of this invention therefore is to develop a new and improved device allowing to overcome the problems the existing devices show for an automated control of the oven temperature, it shall be pointed out that, at least the applicant is not aware of the existence of any device or invention having a similar application showing technical and structural characteristics equal or similar to those appearing in the one that is claimed herein.

EXPLANATION OF THE INVENTION

The universal device for the automation of solid fuel barbecues and ovens proposed by the invention is therefore configured as a significant novelty within its field of application because when implementing it the above objectives are satisfactorily reached, the characterizing details making it possible and distinguishing it from those already known appearing conveniently in the final claims attached to this specification.

More concretely, what the invention proposes, as it was said above, is a universal device to automate the temperature of any oven, barbecue or similar operating by means of the combustion of solid fuels such as charcoal or wood, as well as materials similar to or derived from them. The said device is distinguished in that it comprises an automated draft rotating butterfly valve type, that is incorporated in the chimney or smoke exhaust housed in a module adaptable to it, we shall name chimney module, being driven by a motor that is controlled by an electronic board, incorporated to a second module or control module, which possesses at least a temperature probe located within the oven or barbecue chamber to be controlled.

The device of the invention is concretely composed of two main parts, the chimney module and the control module, the features of which are described below.

The chimney module preferably comprises a hollow cylindric body that is coupled to the chimney or smoke exhaust of the oven within which appear the butterfly type valve driven by a motor, which can be of the servomotor type, stepper motor, or a conventional electric motor with a sensor of position.

The valve is preferably arranged on an axis about which it rotates to be able to close the smoke passage or draft of the chimney in its whole, when located in its closed position that is the horizontal position, allowing thus a quick temperature drop and even allowing to turn off the combustion if wished. The valve also allows the passage of smoke or draft with an opening close to the total diameter of the cylindric body, that is the one of the chimney, when the valve is placed at is maximum opening that is its vertical position. As there scarcely exists any type of restriction to the passage of smoke or draft, the device allows the quick temperature rise as well as to be able to control high temperatures in the oven chamber when required.

Advantageously, the said cylinder body of this chimney module preferably shows, above the valve, a dust-guard that prevents the entrance of rainfall as well as dirt from the exterior within the oven or barbecue, allowing thus its use outside with any climate.

Also, according to another optional characteristic of the invention, the cylindric body of the chimney module shows an external circular cover that constitutes an anti-flow-back means that protects the smoke exhaust from the action of the wind, which can cause smokes drag increasing their exhaust speed by a Venturi effect as well as cause a flow-back effect in the smoke exhaust making it comes back to the interior making the chamber correct combustion impossible.

Last, the chimney module also comprises an anti-spark means that, constituted by a filter incorporated in the cylinder body under the valve, makes impossible their exit to the exterior, creating a safe environment and allowing thus its use in environments where accidents can occur by their action.

On its hand, the control module preferably comprises a shell within which appears housed an electronic board that controls the exact, correct and necessary opening of the valve of the chimney module, to which motor it is connected by a communication cable, processing the information logged in by the room temperature probe situated within the chamber.

In addition, in the preferred embodiment, the said electronic board also possesses one or more connections for coupling foods temperature probes, that means, designed to measure the temperature of the foods being cooked, for which the said probes are ending in a sharp-pointed length that allows it to be pricked in the foods in order to know their internal temperature and to be able to control this way the cooking point wished.

As it was stated, the electronic board of the control module possesses a connection for a communication cable that is used to drive the valve motor.

Likewise, within the shell of its control module and preferably, an internal battery could be available allowing it to operate when no connection to the mains and/or supply connection to the mains is available, which can be used for the connection to an external battery to be able to work in cases where no connection to the mains is available or to increase the range of the internal battery in the event it is incorporated.

Last, it shall be pointed out that, for the user handling the control module, this later preferably possesses either analog buttons close to an information screen in which he shall display the current values of operation as well as those selected or a touch screen in which he can display the above described information, that will serve at same time as keyboard.

In addition, or alternatively, the control module also shows remote control means, by means of an application for mobile devices app or by means of web service. The said remote control means can be matched with any of the other handling options, as well as it could also be offered only with remote connection suppressing the screen and/or buttons in the control module so that the mobile device would be the one carrying out these functions.

Ultimately, what the invention proposes is a universal device to automate the regulation and control of the temperature of ovens, barbecues, their similar and derived ones when they use solid fuel by means of the draft flow or chimney control through the automated butterfly-type valve, composed of a disk located in the axis within the smoke exhaust duct or chimney.

In addition, in second place, the device can comprise a remote control by means of app or web, with an anti-flow-back system and an anti Venturi to suppress the action of the wind on the smoke exhaust, optionally and independently completed; with a dust-guard to prevent the entrance of rainfall or dirt within the chamber, with an anti-sparks system to prevent that the sparks derived from the combustion go outside, with a system of probes for the control of foods cooking and with a system of universal adaptation that allows it to be used in most of the cases to which it is designed.

Is also an object of the invention the oven or barbecue that incorporates the previously described automation device.

In a preferred embodiment, the oven or barbecue also comprises regulating means for the entrance of the intake air in the oven or barbecue. The said regulating means of air entrance are also connected and they can be controlled by the control module.

The described universal device for the automation of solid fuel barbecues and ovens therefore consists in an innovating structure having characteristics unknown up to now for the purpose to which it is designed, reasons that, jointly with its practical utility, provide it with sufficient foundation to obtain the privilege of exclusivity applied for.

BRIEF DESCRIPTION OF THE DRAWINGS

To complement the description that is being carried out, and in order to assist to a best understanding of the characteristics of the invention, is attached to this specification, as an integral part thereof, a set of drawings in which with illustration and non-limiting nature the following has been represented:

FIG. 2 shows a font elevation view of the chimney module that comprises the device of the invention, according to the example shown in the FIG. 1, showing its external general configuration.

FIG. 3 shows a section view of the chimney module according to the A-A section appearing in the FIG. 2, the parts and elements it comprises as well as the configuration and arrangement thereof within it can be seen.

PREFERRED EMBODIMENT OF THE INVENTION

Seen the mentioned figures and in accordance with the numbering adopted, a non-limiting example of embodiment can be seen in them of the universal device for the automation of solid fuel barbecues and ovens of the invention which comprises the parts and elements indicated and described in detail below.

Figure 1:
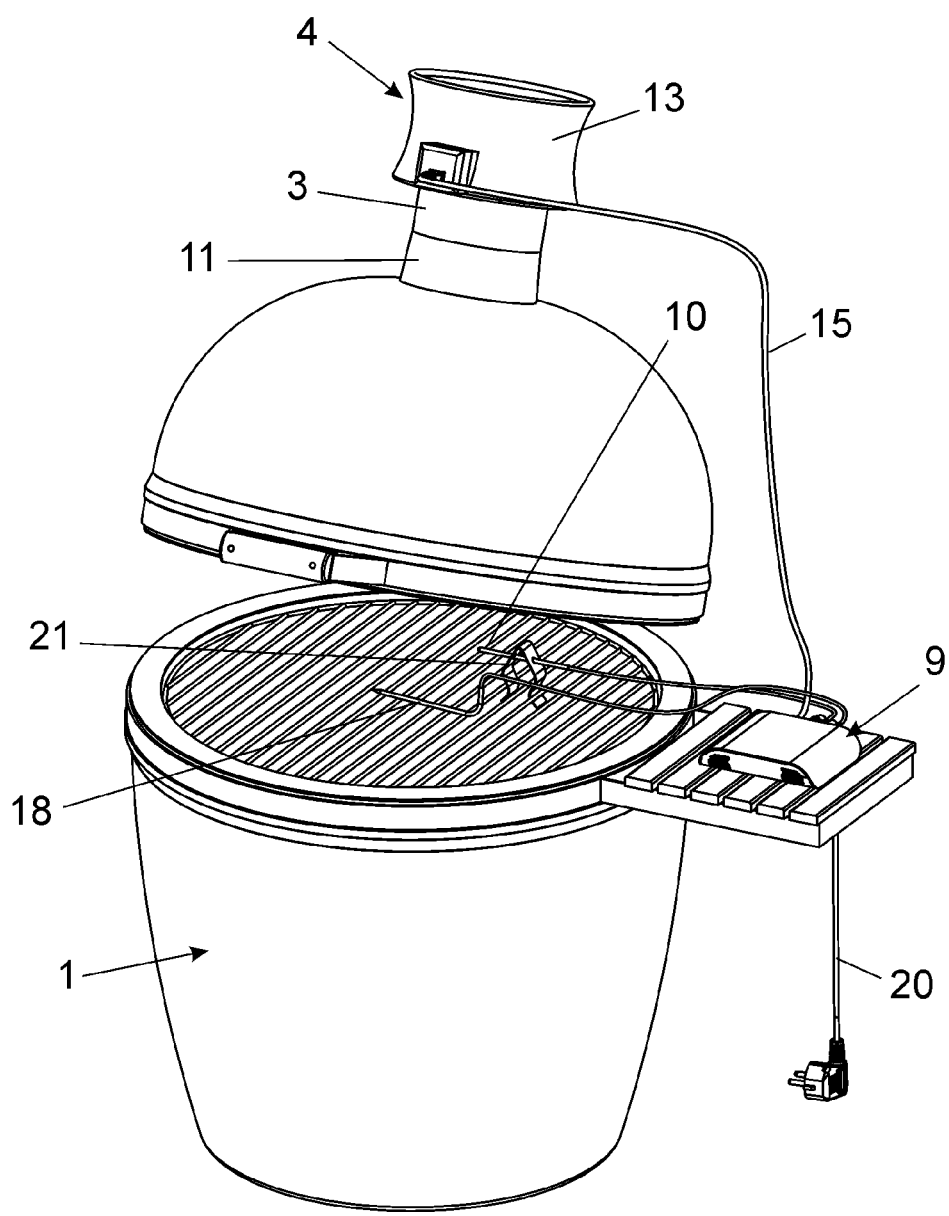
FIG. 1 shows a front view in perspective of a barbecue in which an example of universal device has been installed for the automation of solid fuel barbecues and ovens, object of the invention, showing the main parts that it comprises and their arrangement.

Thus, as it can be seen in the FIG. 1, the device of the invention applicable for ovens, barbecues (1) or similar that use solid fuels, is configured from an automated draft butterfly-type valve (2) that, housed in the body (3) of a chimney module (4) installed at the smoke exhaust of the oven or barbecue (1) to be controlled, rotates about an axis (5) driven by a motor (6) to which it is linked and that is controlled by an electronic board (7) housed in a shell (8) of a control module (9) and which, in turn, possesses a connection with, at least, a room temperature probe (10) that can be located within the chamber of the oven or barbecue (1) to be controlled.

According to the FIGS. 2 and 3, it can be seen how, preferably, the body (3) of the chimney module (4) is a hollow cylindric body, that is coupled to the chimney or smoke exhaust of the oven or barbecue (1) through a universal adapter (11) provided to that aim at its lower end. The said valve (2) that is disk-shaped, remains arranged on the axis (5) in which it rotates, fastened at opposite points within the said body (3), being able to be situated in any position from a closed one, that is the horizontal position, covering the full internal diameter of the said cylindric body (3), to a maximum opening position that is its vertical position.

Also, in the FIG. 3, it can be seen that, preferably the cylindric body of the chimney module (4) incorporates, above the valve (2), a dust-guard (12) that covers it preventing the entrance of rainfall and dirt coming from outside within the oven or barbecue (1).

Preferably, the cylindric body (3) of the chimney module (4) incorporates, an external circular cover (13) that acts as anti-flow-back and anti Venturi effect, that can be seen in the FIGS. 2 and 3.

Advantageously, the cylindric body (3) of the chimney module (4) incorporates under the valve (2), an anti-sparks filter (14), that has been represented in the FIG. 3.

On its hand, in the FIG. 1 it can be seen how, preferably, the electronic board (7) of the control module (9) is connected to the motor (6) of the valve (2) of the chimney module (4) by means of a communication cable (15).

Figure 4:
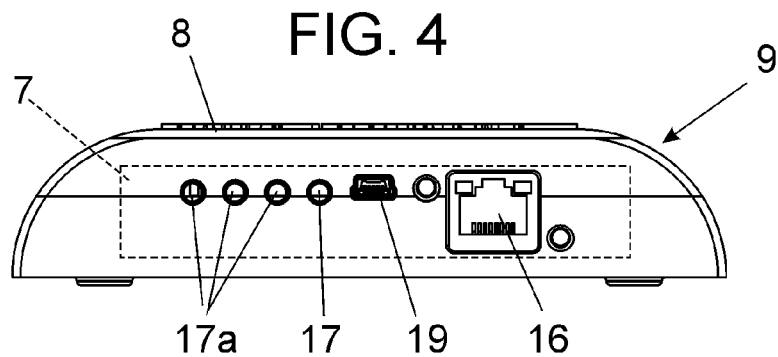
FIG. 4 shows a side elevation view of the control module that comprises the device of the invention, according to the example shown in FIG. 1, its external general configuration can be seen.
Figure 5:
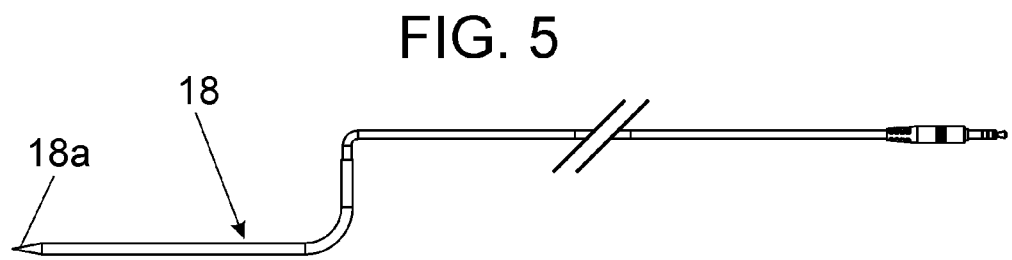
FIGS. 5 and 6 show both side elevation views, of the foods temperature probe and the room temperature probe, respectively, comprised in the device of the invention, the configuration of both can be seen.
Figure 6:
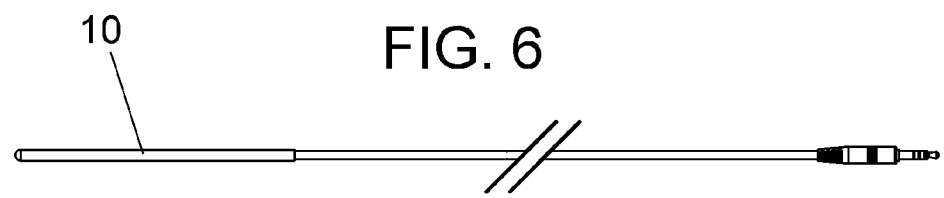

In the FIG. 4 it is represented how the electronic board (7) is housed in the shell (8) of the control module (9), in addition to possesses a connection port (16) for the communication cable (15) and a first dock connector (17) for the room temperature probe (10), shown in the FIG. 6, possessing in addition one or more additional dock connectors (17a) for coupling one or more foods temperature probes (18) which, as it can be seen in the FIG. 5, show a sharp-pointed end (18a) to be pricked in the foods.

Figure 7:
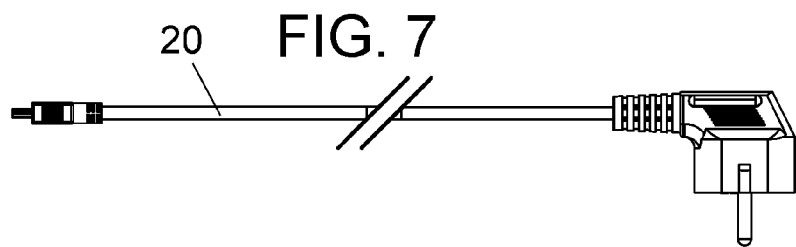
FIG. 7 shows an elevation view of the power cord the device incorporates for its connection to the mains.
Figure 8:
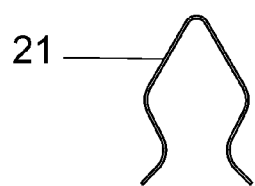
FIGS. 8 and 9 show both views, in front and side elevation, respectively, of a fastening clip for the room temperature probe.
Figure 9:
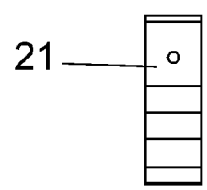

In the FIG. 4, it can be seen, in addition, the connector (19) for a power cord (20) shown in the FIG. 7, that connects with the electronic board (7), optionally an internal battery (not shown) for the said supply having been provided.

Thus, for installing a device in an oven or barbecue (1), the chimney module (4) is incorporated at the smoke exhaust or chimney of the oven or barbecue (1) by using one of the universal adapters (11) that are supplied jointly with the device (1) with different diameters to choose the right measure in each case, which allows to incorporate the module (4) in almost all the models of oven or barbecue (1). The control module (9) is located close to the oven chamber, in a suitable place, such as a side table, placing the room temperature probe (10) fastened with a fastening clip (21), in the grill of the oven or barbecue (1) and thereafter the room temperature probe (10) is connected to the dock connector (17) of the shell (8) of the control module (9).

Thereafter, the foods temperature probes (18) are connected to the additional dock connectors (17a) for food probes of the control module (9) and the communication cable (15) is connected between the chimney module (4) and the control module (9), connecting an end of the connection port (16) provided for it of the chimney module (4) and the other end in the connection port (16) for the said communication cable of the control module (9). Last, it is proceeded to connect a power cord (20) in the connector (19) of the control module (9).

When this universal device has been arranged for its use, it is proceeded to turn on the control device through the handling set of buttons or touch screen or remote control (not shown) it possesses for this purpose, the fuel is introduced in the oven or barbecue combustion chamber (1) and it shall be proceeded to start fire on it as it was done before installing the controlling device. In the control module (9) or in the event there is a remote control provided, in the mobile device used for this, the temperature that is wished within the chamber is selected and from this moment it is the control module (9) through its electronic board (7) that takes charge of accurately regulating the opening of the valve (2) housed in the chimney module (4) to increase or reduce the temperature until it is stabilized at the point in which the user is interested.

The nature of this invention being sufficiently described, as well as the way of implementing it, it is not deemed necessary to further extend its explanation in order that any man of the art comprises its extent and the advantages arising from it and it is pointed out that, within its essence, it can be implemented in other embodiments that differ in details from the one stated for example purpose and to which the protection sought extends provided that its main foundation is not altered, changed of modified.

The invention claimed is:

1. A universal device for the automation of solid fuel barbecues and ovens, said device comprising:
    an automated draft butterfly-type valve (2) housed in a hollow cylindric body (3) of a chimney module (4), the chimney module (4) configured to be installed at a smoke exhaust of the oven or barbecue (1) with a universal adapter (11) positioned at a lower end of the hollow cylindric body (3), the automated draft butterfly-type valve (2) controlled by an electronic control board (7) housed in a control module (9) linked to a motor (6) that rotates the automated draft butterfly-type valve (2) within the hollow cylindric body (3) and that drives the exit of the air flow in response to an exit signal from the electronic control board (7) to the automated draft butterfly-type valve (2), the electronic control board (7) being provided with connection with at least a room temperature probe (10) located within the chamber of the oven or barbecue (1);

an external circular cover (13) having a sidewall that converges then diverges and on which motor (6) and a connection port (16) are mounted, the external circular cover (13) overlying the hollow cylindric body (3) and during operation provide anti-flow-back and an anti Venturi effect;

wherein the automated draft butterfly-type valve (2) is disk-shaped and is housed in the hollow cylindric body (3) of the chimney module (4) and the valve (2) is arranged on an axis (5) on which the automated draft butterfly-type valve (2) rotates, and is fastened at a set of opposing points within the hollow cylindric body (3), the automated draft butterfly-type valve (2) being driven by the motor (6) that is controlled by the electronic control board (7) in response to a measurement from a temperature probe (18) located within the of the oven or barbecue (1), the valve positionable in any range of positions from a closed one, that is a horizontal position, covering a full internal diameter of the hollow cylindric body (3), a partially open position, and to a maximum open position that presents the automated draft butterfly-type valve (2) in a vertical position to the full internal diameter of the hollow cylindrical body (3) so as to provide a continuous range of temperature control as a solid fuel is burnt to increase or reduce the temperature until the temperature is stabilized;

wherein the control module (9) further comprises a power supply; and wherein the control module is controlled via remote control provided by an application on one or more of a mobile device or a web service.

2. The device of claim 1 wherein the hollow cylindric body (3) of the chimney module (4) is coupled to the smoke exhaust of the oven or barbecue (1) through the universal adapter (11).

3. The device of claim 1 further comprises a dust-guard (12) positioned above the valve (2) and within the external circular cover (13) that prevents the entrance of rainfall and dirt within the oven or barbecue (1).

4. The device of claim 1 wherein the chimney module (4) further comprises an anti-spark filter (14) positioned under the automated draft butterfly-type valve (2).

5. The device of claim 1 wherein the electronic control board (7) of the control module (9) is connected to the motor (6) of the chimney module (4) a communication cable (15).

6. The device of claim 1 wherein the electronic control board (7) further comprises connections for one or more foods temperature probes (18) each with a sharp-pointed end (18a) to be pricked in foods.

7. The device of claim 1 wherein the control module (9) further comprises a button set or a touch screen.

8. The device of claim 1 wherein the control module (9) further comprises a battery as the power supply.

9. The device of claim 1 wherein the control module (9) further comprises a connector (19) for a power cord (20) adapted to be connected to the mains.

10. A solid fuel barbecue and oven fitted with the universal device for automation of temperature control according to claim 1.

11. The solid fuel barbecues and ovens according to the claim 10 further comprising automatic regulation of the air intake via the valve (2) connected to the control module (9).

* * * * *